United States Patent
Rodyushkin et al.

(10) Patent No.: US 7,492,924 B2
(45) Date of Patent: Feb. 17, 2009

(54) FACE TRACKING

(75) Inventors: Konstantin V. Rodyushkin, N. Novgorod (RU); Boris M. Chiudinovich, N. Novgorod (RU)

(73) Assignee: Intel Corporation, Santa Clara, CA (US)

( * ) Notice: Subject to any disclaimer, the term of this patent is extended or adjusted under 35 U.S.C. 154(b) by 852 days.

(21) Appl. No.: 10/623,127

(22) Filed: Jul. 18, 2003

(65) Prior Publication Data
US 2005/0074148 A1    Apr. 7, 2005

(51) Int. Cl.
*G06K 9/00*    (2006.01)
(52) U.S. Cl. .................. 382/115; 382/117; 382/118
(58) Field of Classification Search ............... 382/115, 382/117, 118, 159
See application file for complete search history.

(56) References Cited

U.S. PATENT DOCUMENTS

| | | | |
|---|---|---|---|
| 5,450,504 A * | 9/1995 | Calia ........................ | 382/118 |
| 6,088,040 A * | 7/2000 | Oda et al. .................. | 345/473 |
| 6,879,709 B2 * | 4/2005 | Tian et al. .................. | 382/118 |
| 6,934,406 B1 * | 8/2005 | Nakano ..................... | 382/118 |
| 6,944,319 B1 * | 9/2005 | Huang et al. ............... | 382/118 |
| 7,020,305 B2 * | 3/2006 | Liu et al. ................... | 382/107 |
| 7,027,621 B1 * | 4/2006 | Prokoski ................... | 382/118 |

OTHER PUBLICATIONS

Alan L. Yuille et al., "Feature Extraction from Faces Using Deformable Templates", Feb. 11, 1992; International Journal of Computer Vision, pp. 99-111.

Douglas DeCarlo et al., "The Integration of Optical Flow and Deformable Models with Applications to Human Face Shape and Motion Estimation", 1996, IEEE Computer Society Conference on Computer Vision and Pattern Recognition, pp. 231-238.

Marius Malciu et al., "A Robust Model-Based Approach for 3D Head Tracking in Video Sequences"; Institut National des Telecommunications ARTEMIS Project Unit.

Soo-Change Pei et al.; "Robust Face Detection for Different Chromatic Illuminations", Sep. 2002; IEEE ICIP, pp. 765-768.

Douglas Chai et al.; "Face Segmentation Using Skin-Color May Videophone Applications", Jun. 1999; IEEE Transactions pp. 551-564.

Salih Burak Gokturk et al., "A Data-Driven Model for Monocular Face Tracking"; 2001; IEE pp. 701-708.

Ming-Hsuan Yang et al., "Detecting Human Faces in Color Images" 1998, IEEE pp. 127-130.

Stephen J. Mckenna et al., "Modelling Facial Colour and Identity With Gaussian Mixtures" Dec. 1998; The Journal of Pattern Recognition; Vo. 31, No. 12, pp. 1883-1892.

Marius Malciu et al., "Tracking facial features in video sequences using a deformable model-based approach", 2000, Proceedings of SPIE pp. 51-62.

* cited by examiner

*Primary Examiner*—Brian Q Le
(74) *Attorney, Agent, or Firm*—Fish & Richardson P.C.

(57) ABSTRACT

A medium bears a deformable model configured to enable a machine to estimate positions of four points defined by X and Y coordinates, each of the points representing a facial element position in a digital image.

3 Claims, 3 Drawing Sheets

FACE TRACKING

TECHNICAL FIELD

This invention relates to face tracking.

BACKGROUND

Face recognition technology (FRT) (also referred to as face tracking) is a vital part of a broad area of pattern recognition. Face tracking in general, and the tracking of moving people in natural scenes in particular, require a basic set of visual tasks to be performed robustly. This face tracking process typically includes three tasks, i.e., acquisition, normalization and recognition. The term acquisition refers to the detection and tracking of face-like image patches in a dynamic scene and localizing the face region from these patches. Normalization includes the alignment and normalization of the face images. Recognition is the representation and modeling of face images as identities, which can include the association of novel face images with known models.

Face tracking has involved two main approaches, i.e., a feature geometrical approach and a pictorial approach. The geometrical approach uses a spatial configuration of the facial features. The pictorial approach uses templates of the facial features.

A more recent approach is referred to as a deformable template approach that combines the elements of both pictorial and feature geometry approaches and has been applied to faces with varying pose and expression.

Being able to track a face from images contributes toward an ability to monitor a user's attention and reactions automatically and without intrusion, and has benefits in human-machine interaction.

DETAILED DESCRIPTION

Figure 1:
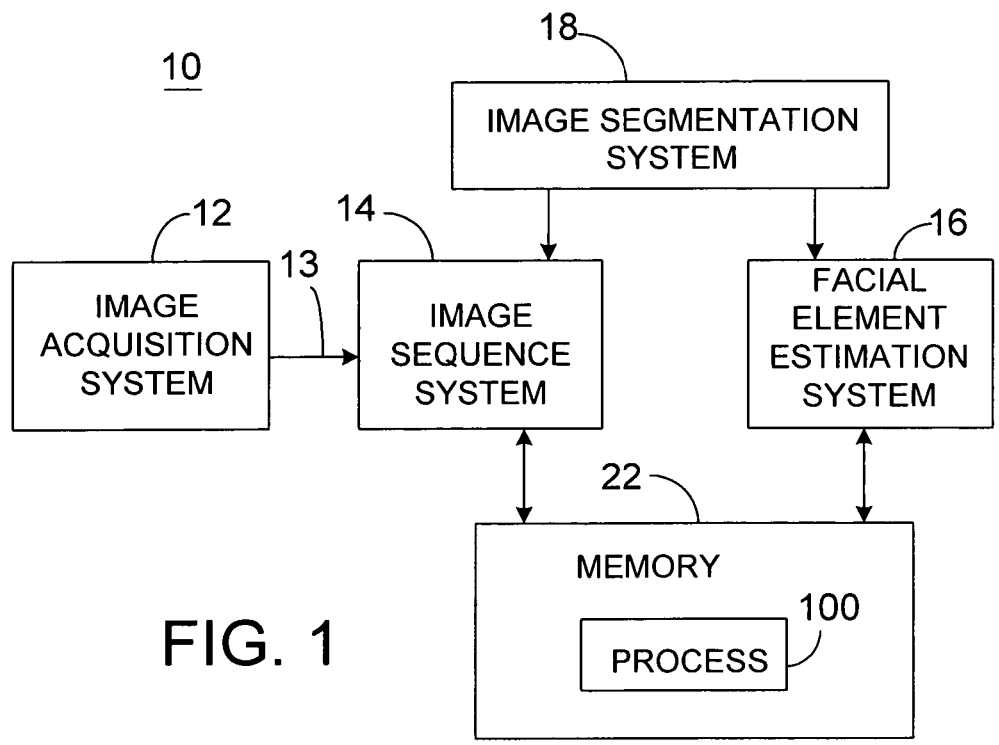
FIG. 1 is a block diagram.

Referring to FIG. 1, a system 10 includes a digital image acquisition system 12 that directs a sequence of digital images 13 of a human face to a digital image sequence manager 14. The digital image sequence manager 14 controls the system 10 by directing the sequence of digital images 13 to a facial element estimation system 16, where at least on a first digital image of the sequence of N digital images 13, selected facial elements are estimated by a digital image segmentation system 18. The facial element estimation system 16 uses a parameterized model of face motion, stored in a memory 22, to evaluate a position of each facial element on any digital image in the sequence of digital images 13. Parameters of a face model describe a position of the face and its features.

On a first frame in the sequence of digital images 13 facial element estimation system 16, in a time and resource intensive process, initially determines two sets of model parameters using a facial element position obtained by the digital image segmentation system 18. A first set of parameters model the tracked face size and relative positions of facial features; this is referred to as a base face model. A second set of parameters describe deformation, rotation and shifting of the base face model, and along with the first set of parameters, defines positions of facial elements in the first frame. For each subsequent frame a warped (i.e. changed) digital image is formed by its shifting and rotating using the first set of parameters found on the first frame (i.e., base face model) and second set of parameters found on the previous frame. This subsequent determination is significantly less time and resource intensive than the initial determination. The warped digital image eliminates rotation of the face region between the processed digital image and digital image with a normal face orientation. Subsequently, the facial element estimation system 16 determines a second set of parameters modeling the positions of the eye regions and mouth region on the digital image. The two sets of parameters are used by the facial element estimation system 16 to determine a position of the eye regions and mouth region on an image in the sequence of digital images 13.

More specifically, the digital image acquisition system 12, such as a camera, captures digital images of a user's face. The digital image sequence manager 14 receives the digital image sequence 13 from the digital image acquisition system 12 and stores the digital image sequence 13 in memory 22. Memory 22 is defined herein as any element in which a digital image can be stored. Alternatively, the digital image acquisition system 12 can receive digital image sequences from a storage device (not shown), such as a hard drive or an optical disk, connected directly thereto or remotely from a network or the like (not shown). Memory 22 includes a face tracking process 100, described below.

After receiving from the digital image acquisition system 12 a first digital image in the digital image sequence 13, the digital image sequence manager 14 invokes digital image segmentation system 18 to locate the face and its features in the first digital image frame. This initial determination of the location of the face and its features is very time and resource intensive. Segmentation performed by the digital image segmentation system 18 is performed either manually or automatically. Manual segmentation is accomplished by pointing to positions of eyes centers and mouth corners by users. Alternatively, automatic segmentation can be performed.

If we consider tracking the motion of an observed face, one can use a general purpose object-tracker, one that simply sees the face as a deforming (changing) surface. But faces have a highly constrained appearance and motion.

Instead, system 10 uses a model-based approach that describes an appearance, shape and motion of faces to aid in estimation. A model has a number of parameters, some of which describe a shape of a resulting face and some describe its motion. The model is not detailed enough to represent any person's face making any expression. However, the model is able to represent a face to an acceptable degree of accuracy. A benefit of this simplifying assumption is that we can have a fairly small set of parameters that describe a face. This results in a more efficient, and more robust system.

Figure 2:
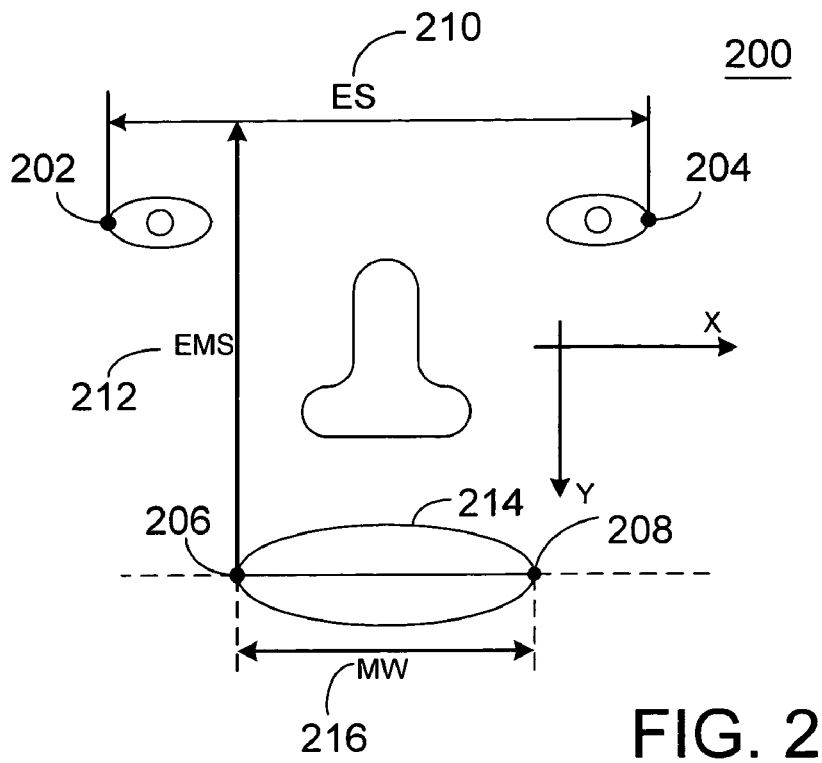
FIG. 2 is a block diagram of a base face model.

Referring to FIG. 2, a base face model 200 includes four points defined by X and Y coordinates. Two of these points correspond to two eye centers 202, 204, and to two mouth corners 206, 208. ES 210 represents a distance between eye corners 202, 204, EMS 212 represents a distance between eye corners 202, 204 and mouth 214, and MW 216 represents a distance between mouth corners 206, 208. The base face model 200 represents facial characteristics in a video frame. The sum of X and Y coordinates of facial points of the base model 200 is zero. Lines connecting eye centers and mouth corners are approximately horizontal lines.

Referring again to FIG. 1, process 100 provides face tracking using deformable template matching on intensity gradient maps. Process 100 uses a base face model, such a base face model 200, and a second parameter set estimated on a previous frame to estimate an initial model of a current position of a face. Process 100 estimates eye centers and mouth corner positions on each frame of a digital image sequence, matching estimates of a current face model with facial characteristics on a current video frame. The initial estimates determine an estimate on the previous frame template and the subsequent estimates determine a deformed, current, template. As the next video frame arrives the current template is used as an initial estimation of a new template and subsequent estimates are determined on the, new current video frame, thus saving significant processing time and resources that are expanded in determining the parameters representing the initial base face model 200.

In general, deformable template modeling is a generic model-oriented energy minimization-based approach for solving non-rigid segmentation and matching problems in computer vision. A deformable template is a discrete parametric model that provides an archetypical description of shape properties of a specific class of objects, i.e., an original model or type after which other similar things are patterned. The ability of templates to model in a compact fashion highly variable objects with multiple parts and complex topologies makes them particularly relevant for face analysis in digital image sequences, including segmentation, non-rigid facial element estimation, coding, indexing and recognition.

Specifying a deformable template requires definition of a discrete parametized geometry, an internal energy function, denoted by $E_{int}$, which sets a priori constraints on the variability of shape properties of the template model, and an external energy function, denoted by $E_{ext}$, which establishes interaction constraints in order to maintain a consistency between the template geometry and relevant digital image features. Template matching is then performed by minimizing the total energy function E template defined as a sum of the internal and external energy functions, $E_{template} = E_{int} + E_{ext}$.

Figure 3:
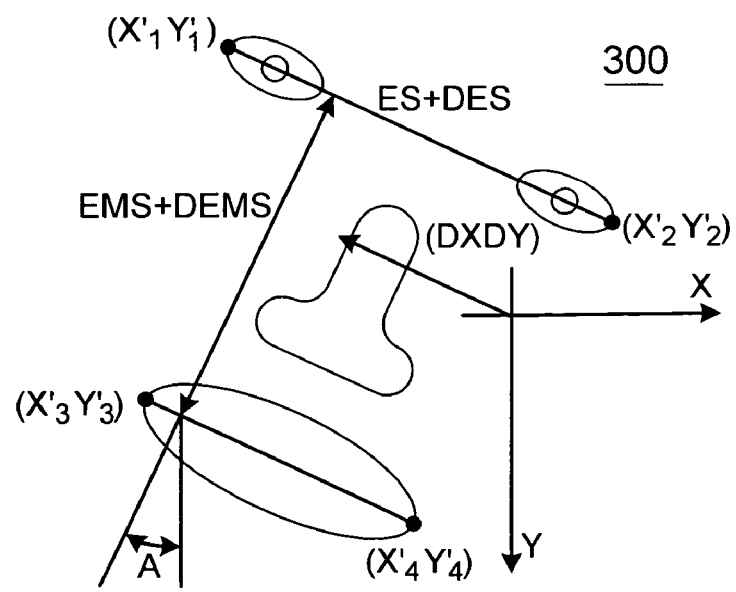
FIG. 3 is a block diagram of a transformed face model.

Referring now to FIG. 3, a transformed face model 300 is shown. The transformed face model 300 represents a change of the orientation/location of facial characteristics, i.e., eyes and mouth, from the initial (or previous) orientation/location of facial characteristics of the base face model 200. Once a current (transformed) face model is calculated, the current face model becomes an initial (or base) model for a next digital image in a sequence of digital images 13. Process 100 provides a transformation of the base face model 200, such as transformed face model 300, and subsequent face models, that is defined by six parameters, i.e., DES, DEMS, DMW, A, DX and DY. DES is the distance increase between eyes. DEMS is the distance increase between eyes and mouth. DMW is the distance increase between mouth corners. A is the rotation angle of the whole face model. DX and DY are shift values along X and Y axes accordingly.

Coordinates of the model points are defined as $X_i$ and $Y_i$, where i=1 designates the left eye, i=2 designates the right eye, i=3 designates the left mouth corner and i=4 designates the right mouth corner. Transformation of the base model (defined by $X_i$ and $Y_i$ coordinates) into a current model (defined by $X'_i$ and $Y'_i$ coordinates) is described by the following formulas:

$$X'_i = \cos(A) XX_i - \sin(A) YY_i + DX$$

$$Y'_i = \sin(A) XX_i + \cos(A) YY_i + DY,$$

where, $$XX_i = (1+DES/ES) X_i \text{ for } i=1 \ldots 2,$$

$$XX_i = (1+DES/ES)(1+DMW/MW) X_i \text{ for } i=3 \ldots 4,$$

$$YY_i = (1+DEMS/EMS) Y_i \text{ for } i=1 \ldots 4.$$

For each new digital image from a digital image sequence, frame transformation parameters (DES, DEMS, DMW, A, DX, DY) are calculated in process 100 by minimizing an objective function.

In general, an objective function measures a misfit between data and a corresponding modeling result. We denote this objective function as E(T,I(x, y)). Here, I(x, y) is an intensity map of a current digital image rotated by −A*. Angle A* is a transformation angle of the base face model estimated in the previous frame. T=(DES, DEMS, DMW, A, DX, DY) is a looked for vector of the transformation parameters.

The objective function E(T, I(x,y)) includes two terms:

$$E(T,I(x,y)) = E_{ext}(T, I(x,y)) + E_{int}(T)$$

The first term $[E_{ext}(T, I(x, y))]$ of the objective function is an external energy term that defines how well the transformed model matches the face on a real image I(x,y).

The second term $[E_{int}(T)]$ of the transformation function is an internal energy term which defines a certain penalty for model deformation T, where model deformation refers to a change of the parameters of a base face model to the parameters of an estimated, current face model.

The external energy term $E_{ext}(T, I(x, y))$ is written as a sum of eyes energy, mouth energy and nose energy, i.e., $$E_{ext}(T,I(x,y)) = E_{EYES}(T,I(x,y)) + E_{MOUTH}(T,I(x,y)) + E_{NOSE}(T,I(x,y)),$$

where $$E_{EYES}(T, I(x, y)) = \frac{k_1}{S(A_{EL}+A_{ER})} \sum_{A_{EL}+A_{ER}} I_y(x, y) \frac{k_2}{S(A_{EL}+A_{ER})} \sum_{A_{EL}+A_{ER}} I_x(x, y) + \frac{k_3}{S(A_{UEL}+A_{UER})} \sum_{A_{UEL}+A_{UER}} I_y(x, y) + \frac{k_4}{S(A_{IE})} \sum_{A_N} I_y(x, y),$$

$$E_{MOUTH}(T, I(x, y)) = -\frac{k_5}{S(A_M)} \sum_{A_M} I_y(x, y) - k_6 \left( \frac{1}{S(A_{Mlr}+A_{Mrl})} \sum_{A_{Mlr}+A_{Mrl}} I_y(x, y) - \frac{1}{S(A_{Mlr}+A_{Mrl})} \sum_{A_{Mlr}+A_{Mrr}} I_y(x, y) \right)$$

$$E_{NOSE}(T, I(x, y)) = -k_7 \frac{1}{S(A_N)} \sum_{A_N} I_y(x, y).$$

Figure 4:
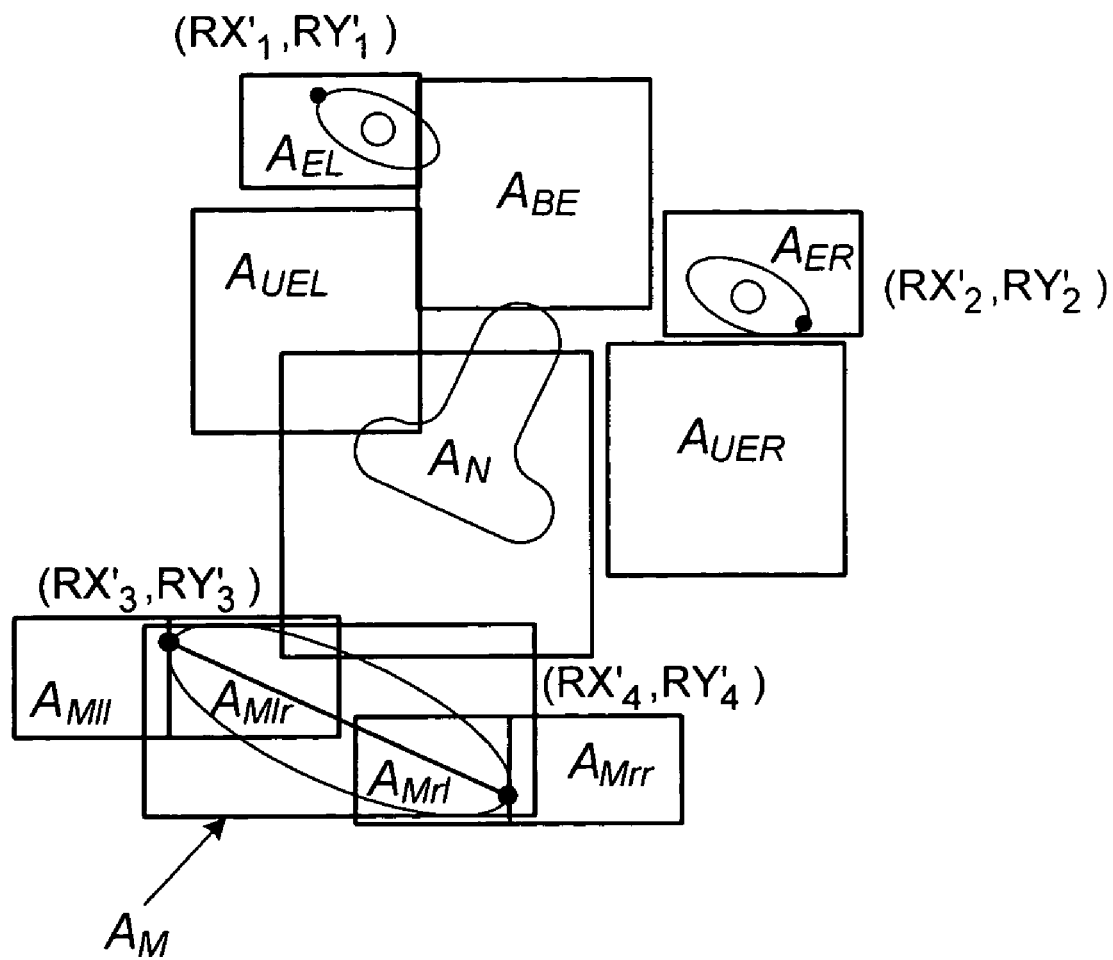
FIG. 4 is a block diagram of integration areas.

Referring to FIG. 4, integration areas are shown on an image 400 in which $I_y(x,y) = |I(x,y) - I(x,y+1)|$ and $I_x(x, y) = |I(x,y) - I(x+1,y)|$. The coefficients $k_i$ (i=1 ... 7) are certain weights for each term and the values are determined empirically. $\Sigma \ldots$ is a rectangle $A_{xxx}$ sum. $S(A_{xxx})$ is an area of rectangle $A_{xxx}$, $A_{EL}$ is the rectangle area of the left eye. $A_{ER}$ is the rectangle area of the right eye, $A_{UEL}$ is the rectangle area under the left eye, and $A_{UER}$ is the rectangle area under the right eye. $A_{BE}$ is the rectangle area between eyes, $A_N$ is the rectangle area of the nose, and $A_M$ is the rectangle area of the whole mouth. $A_{Mll}$ is the left rectangle area of the left mouth corner, $A_{Mlr}$ is the right rectangle area of the left mouth corner, $A_{Mrl}$ is the left rectangle area of the right mouth corner, and $A_{Mrr}$ is the right rectangle area of the right mouth corner.

In general, all area positions and sizes are dependent on eyes sizes, mouth sizes and individual face properties. For example, an eye area width and a height must be equal to a real eye width and height, the mouth height also depends on the real mouth height and the degree of mouth open ability. For a standard face, the following area parameters are preferred. If $RX'_i$ and $RY'_i$ are coordinates of a current face model on a rotated image $I(x, y)$, ES' is the distance between eyes for the current transformed face model, MW' is the distance between the mouth corners for the current transformed face model, then $A_{xxx}$ are rectangles with coordinates and sizes shown in Table 1.

TABLE 1

| | Center X | Center Y | Width | Height |
|---|---|---|---|---|
| $A_{EL}$ | $RX'_1$ | $RY'_1$ | ES'/2 | ES/4 |
| $A_{ER}$ | $RX'_2$ | $RY'_2$ | ES'/2 | ES/4 |
| $A_{UEL}$ | $RX'_1$ | $RY'_1 + 3ES/8$ | ES'/2 | ES/2 |
| $A_{UER}$ | $RX'_2$ | $RY'_2 + 3ES/8$ | ES'/2 | ES/2 |
| $A_{BE}$ | $(RX'_1 + RX'_2)/2$ | $(RY'_1 + RY'_2)/2$ | ES'/2 | ES/2 |
| $A_M$ | $(RX'_3 + RX'_4)/2$ | $(RY'_3 + RY'_4)/2$ | MW' | MW/2 |
| $A_{Mll}$ | $RX'_3 - MW/8$ | $RY'_3$ | MW/4 | EMS/4 |
| $A_{Mrr}$ | $RX'_4 + MW/8$ | $RY'_4$ | MW/4 | EMS/4 |
| $A_{Mlr}$ | $RX'_3 + MW/4$ | $RY'_3$ | MW/4 | EMS/4 |
| $A_{Mrl}$ | $RX'_4 - MW/4$ | $RY'_4$ | MW/2 | EMS/4 |
| $A_N$ | $(RX'_1 + RX'_2 + RX'_3 + RX'_4)/4$ | $0.4(RY'_1 + RY'_2)/2 + 0.6(RY'_3 + RY'_4)/2$ | 1.3ES/2 | EMS/2 |

As all areas have a rectangle form, the $E_{ext}$ is relatively simple to compute. If cumulative maps of vertical and horizontal gradients are generated, the computational complexity of the proposed objective function is O(1), which allows for fast function optimization and therefore a fast face tracking procedure.

The internal energy term $E_{int}(T)$ includes the following terms:

$$E_{int}(T) = e_{EMS}E_{elastic}(DEMS, 0.1EMS, 0.07EMS, 0.1EMS, 0.4EMS) + e_{ES}E_{elastic}(DES, 0.1ES, 0.07ES, 0, 0.25ES) + e_{MW}E_{elastic}(DMW, 0.15MW, 0.15MW, 0.15MW, 0.15MW) + e_A E_{elastic}(180A/\pi, 30, 40, 30, 40)$$

These terms determine an ability to change the base face model proportion and rotation angle. The function $E_{elastic}(x, p_1, p_2, m_1, m_2)$ is defined as follows:

$$E_{elastic}(x, p_1, p_2, m_1, m_2) = \begin{cases} 0, & \text{if } x > -m_1 \text{ and } x < p_1 \\ \left(\frac{x - p_1}{p_2}\right)^2, & \text{if } x \geq p_1 \\ \left(\frac{x + m_1}{m_2}\right)^2, & \text{if } x \leq -m_1 \end{cases}$$

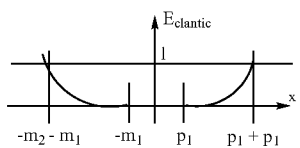

The parameters $p_1$ and $m_1$ define the range of free deformation and parameters $p_2$ and $m_2$ define a penalty for additional face model deformation.

The resulting $E(T, I(x, y))$ objective function is minimized to find optimal transformation parameters T=(DES, DEMS, DMW, A, DX, DY). A downhill simplex method with initial parameters equal to the transformation parameters, computed in the previous frame, is used for this purpose. After optimal T* is computed, the positions of eyes centers and mouth corners are calculated transforming the base face model.

The downhill simplex method (DSM) takes a series of steps as follows. First, it finds the point where the objective function is highest (high point) and lowest (low point). Then it reflects the simplex around the high point. If the solution is better, it tries an expansion in that direction, else if the solution is worse than the second-highest point it tries an intermediate point. If no improvement is found after a number of steps, the simplex is contracted, and started again. An appropriate sequence of such steps will always lead to a local minimum. Better results are obtained when large steps are tried.

Process 100 does not depend on the face and background color, intensity changes, and does not require an exact face three dimensional (3D) model. For stable facial tracking, it is preferred that an inter-frame face movement is less than the following values:

MaxDX=0.25ES, MaxDY=0.13ES, MaxA=7°

In an example, process 100 can be implemented using the C programming language on a 2.2. GHz Intel® Pentium® 4 processor-based workstation. Face tracking time on a 320× 240 image has been determined to be about 3-4 milliseconds (ms) for each frame (250-350 FPS). This period of time includes image rotation, edge detection and objective function minimization. In this example, the coefficients in Table 2 are chosen:

TABLE 2

| $k_1$ | $k_2$ | $k_3$ | $k_4$ | $k_5$ | $k_6$ | $k_7$ | $e_{EMS}$ | $e_{ES}$ | $e_{MW}$ | $e_A$ |
|---|---|---|---|---|---|---|---|---|---|---|
| 1 | .2 | 1 | 1 | 1 | 1 | 1 | 50 | 50 | 50 | 50 |

These coefficients are chosen in a rough empirical way and can therefore be tuned for better results.

Process 100 provides fast and robust face tracking. Process 100 is based on a deformable template technique. In comparison with prior deformable template methods applied to the face-tracking task, process 100 has an extremely low computational cost. Process 100 does not depend on the face color, illumination level changes and does not have an accumulation error because process 100 is based only on an analysis of current image edges maps. Process 100 does not require a complex 3D model of the tracked face and therefore does not require complex initialization on the first frame, which can be difficult to make automatically. Thus, process 100. can be used in a real-time multimedia application for rough estimation of eyes and mouth positions in video sequence.

Figure 5:
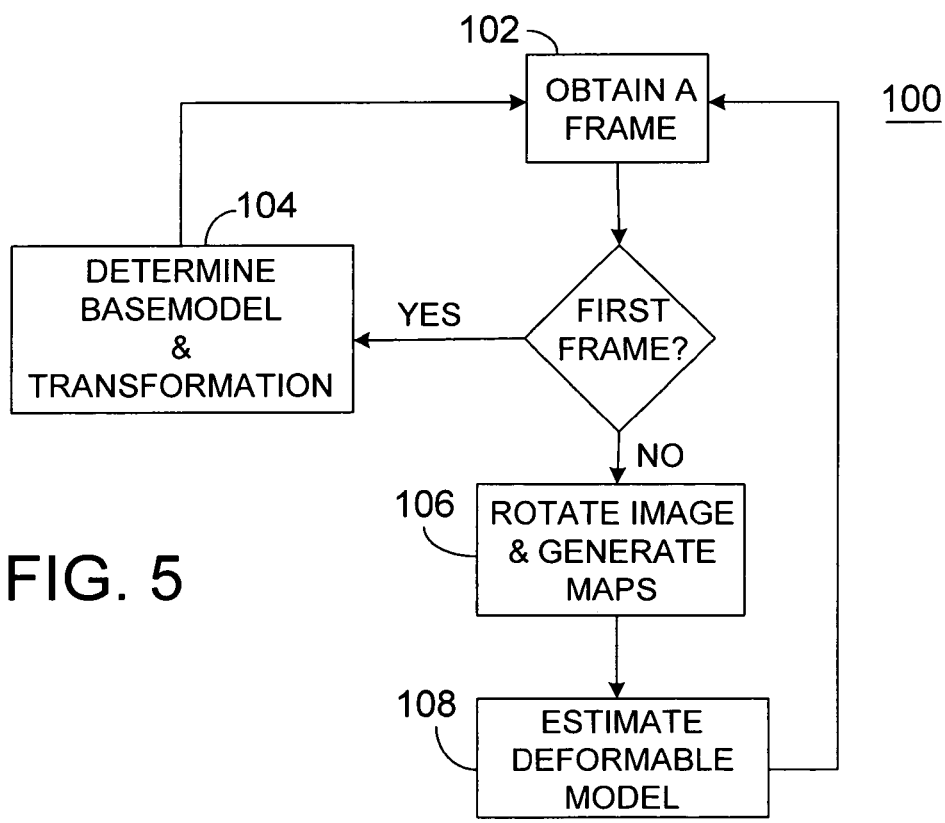
FIG. 5 is a flow diagram.

Referring now to FIG. 5, the face tracking process 100 includes obtaining (102) a digital image from a sequence of digital images and determining (104) a base face model on the digital image. The process 100 rotates the digital image and estimates (106) a horizontal gradient map and a vertical gradient map. The process 100 determines (108) an optimal face deformable model transformation by optimizing an objective function that generates facial element positions.

Process 100 performs face tracking based on a face deformable model template applied to horizontal and vertical intensity gradient maps of a rotated image. Process 100 estimates features, i.e., the positions of eyes centers and mouth corners, on each frame of a video sequence by using deformable model templates. These deformable model templates are specified by a set of parameters that enables a priori knowledge about the expected shape of the features to guide detection. In general, a minimum of the energy function corresponds to a best fit with the image. The parameters of the model template are then updated by downhill simplex method. This corresponds to following a path in parameter space. Changing these parameters corresponds to altering position, orientation, size, and other properties of the model template. The initial values of the parameters are determined from the previous video frame.

Process 100 receives as input an image sequence $I_1$, $I_2$, ..., $I_k$, and eye centers and mouth corners coordinate on the first frame $I_1$, and outputs eye centers and mouth corners coordinates on the frames $I_2$, $I_3$, ..., $I_k$. For each image $I_i$, if i=1, then process 100 estimates a base model $M_b$ and its transformation T' by eye centers and mouth corners coordinates on the first frame $I_1$. For subsequent images ($I_{i>1}$), process calculates an initial model M as a transformed base model $M_b$ using transform parameters T' and rotates $I_i$ to I(x,y) for a normalized model M (e.g., eye centers and mouth corners on horizontal line). Process 100 calculates a horizontal and vertical gradient map on the rotated image $I_i$ and estimates new transformation parameters T* by minimizing the energy function E(T,I(x,y)), where T*=arg $\min_T$ E(T,I(x,y)). For minimization a downhill simplex method is used with initial transformation parameters T=T'. Process 100 calculate eye centers and mouth corners by the transform base model $M_b$ using determined transformation parameters T*, and sets T' to T*. Process 100 then receives a next image.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of embodiments of the invention by operating on input data and generating output. Method steps can also be performed by, and apparatus of embodiments of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Other embodiments are within the scope of the following claims.

What is claimed is:

1. A computer-implemented method comprising:
using a processor to perform the steps of:
receiving a first digital image in a sequence of digital images and eye and mouth coordinates;
outputting eye and mouth coordinates on a subsequent digital image in the sequence of digital images; and
computing transformation parameters that represent a transformation from a base face model for the first digital image to a subsequent deformable model for the subsequent digital image;
wherein receiving comprises estimating the base face model, denoted Mb, and the base face model's transformation parameters, denoted T', by the eye and mouth coordinates;
wherein outputting comprises:
calculating an initial model, denoted M, for the subsequent digital image as a transformed base model Mb using the transformation parameters T',
rotating the subsequent image to the first digital image, denoted I(x,y), to generate a normalized model of the initial model M;
calculating a horizontal and vertical gradient map on the rotated image; and
estimating new transformation parameters, denoted T*, by minimizing an energy function E(T,I(x,y)) representative of the goodness of fit between the transformed model and the corresponding digital image, and of the optimality of the new transformation parameters, where T* corresponds to the complex argument of the minimum of the energy function, denoted arg min T E(T,I(x,y)).

2. The method of claim 1 in which minimizing comprises a downhill simplex method with initial transformation parameters T=T'.

3. The method of claim 1 further comprising calculating the eye centers and the mouth corners by the transformed base model using the transformation parameters T*.

* * * * *